US012117366B2

(12) United States Patent
Ikejiri et al.

(10) Patent No.: US 12,117,366 B2
(45) Date of Patent: Oct. 15, 2024

(54) DIAGNOSING APPARATUS AND DIAGNOSING METHOD FOR INTERNAL COMBUSTION ENGINE

(71) Applicant: TOYOTA JIDOSHA KABUSHIKI KAISHA, Toyota (JP)

(72) Inventors: Yuki Ikejiri, Nishio (JP); Akihiro Katayama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/328,905

(22) Filed: Jun. 5, 2023

(65) Prior Publication Data

US 2023/0400386 A1 Dec. 14, 2023

(30) Foreign Application Priority Data

Jun. 8, 2022 (JP) .................................. 2022-093070

(51) Int. Cl.
*G01M 15/11* (2006.01)
*F02D 41/00* (2006.01)
(Continued)

(52) U.S. Cl.
CPC ......... *G01M 15/11* (2013.01); *F02D 41/0087* (2013.01); *F02D 41/22* (2013.01); *F02D 41/38* (2013.01); *F02D 2041/224* (2013.01)

(58) Field of Classification Search
CPC .... G01M 15/11; F02D 41/0087; F02D 41/22; F02D 41/38; F02D 2041/224;
(Continued)

(56) References Cited

U.S. PATENT DOCUMENTS

2014/0261309 A1   9/2014   Chen et al.
2014/0261317 A1   9/2014   Loucks et al.
(Continued)

FOREIGN PATENT DOCUMENTS

JP   2001-271701 A   10/2001
JP      5821566 B2   11/2015
(Continued)

OTHER PUBLICATIONS

Machine Translation of JP2021038742A PDF File Name: "JP2021038742A_Machine_Translation.pdf".*

*Primary Examiner* — Grant Moubry
*Assistant Examiner* — Ruben Picon-Feliciano
(74) *Attorney, Agent, or Firm* — Finnegan, Henderson, Farabow, Garrett, Dunner, LLP (57) ABSTRACT

An electronic control unit is used for an internal combustion engine that executes a specific-cylinder fuel cutoff process in which combustion in part of cylinders is stopped and combustion is continued in the remaining cylinders. The electronic control unit diagnoses whether there is a misfire anomaly in the internal combustion engine based on a misfire frequency of the internal combustion engine. The electronic control unit executes a normality restoration diagnosing process of diagnosing, in a state in which it is diagnosed that there is a misfire anomaly, that the misfire anomaly has been resolved when a measured value of the misfire frequency becomes less than or equal to a specified normality restoration determination value. The normality restoration diagnosing process is configured to not diagnose, during the execution of the specific-cylinder fuel cutoff process, that the misfire anomaly has been eliminated.

8 Claims, 3 Drawing Sheets

(51) Int. Cl.
*F02D 41/22* (2006.01)
*F02D 41/38* (2006.01)

(58) Field of Classification Search
CPC ........... F02D 41/2403; F02D 2041/228; F02D 2200/1015
See application file for complete search history.

(56) References Cited

U.S. PATENT DOCUMENTS

| | | |
|---|---|---|
| 2015/0075458 A1 | 3/2015 | Parsels et al. |
| 2015/0192080 A1 | 7/2015 | Younkins et al. |
| 2015/0233289 A1 | 8/2015 | Younkins et al. |
| 2016/0024981 A1 | 1/2016 | Parsels et al. |
| 2016/0061127 A1 | 3/2016 | Chen et al. |
| 2017/0101956 A1 | 4/2017 | Younkins et al. |

FOREIGN PATENT DOCUMENTS

| | | | |
|---|---|---|---|
| JP | 6672392 B2 | | 3/2020 |
| JP | 2021038742 A | * | 3/2021 |

* cited by examiner

DIAGNOSING APPARATUS AND DIAGNOSING METHOD FOR INTERNAL COMBUSTION ENGINE

BACKGROUND

1. Field

The present disclosure relates to a diagnosing apparatus and a diagnosing method for an internal combustion engine.

2. Description of Related Art

In an internal combustion engine mounted on a vehicle or the like, a misfire frequency may increase due to anomalies in the fuel system, the ignition system, or the like. That is, a misfire anomaly may occur. Japanese Laid-Open Patent Publication No. 2001-271701 discloses a diagnosing apparatus that detects the occurrence of misfire based on rotational fluctuation of an internal combustion engine caused by misfire, and determines that there is a misfire anomaly when the frequency of the detected misfire is higher than or equal to a certain level.

Even when a misfire anomaly occurs, the anomaly is temporary and may be resolved spontaneously. Accordingly, the above-described diagnosing apparatus may perform a normality restoration determination, or determines that a misfire anomaly has been resolved, when the misfire frequency becomes low after it is determined that there is a misfire anomaly.

Some internal combustion engines may execute a specific-cylinder fuel cutoff process, in which combustion in part of the cylinders is stopped and combustion is continued in the remaining cylinders. Since combustion is not performed in the cylinder subjected to the combustion stop in the specific-cylinder fuel cutoff process, misfire does not occur. Therefore, when there is a latent misfire anomaly in the cylinder subjected to combustion stop, a misfire that should occur does not in the cylinder subjected to the combustion stop during the execution of the specific-cylinder fuel cutoff process. Therefore, the above-described diagnosing apparatus erroneously determines that the misfire frequency has decreased and a misfire anomaly has been eliminated even if a latent misfire anomaly continues to exist in part of the cylinders of the internal combustion engine in which the specific-cylinder fuel cutoff process is being executed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a diagnosing apparatus for an internal combustion engine is provided. The internal combustion engine is configured to execute a specific-cylinder fuel cutoff process in which combustion in part of cylinders is stopped and combustion is continued in the remaining cylinders. The diagnosing apparatus includes processing circuitry. The processing circuitry is configured to execute a misfire anomaly diagnosing process of diagnosing whether there is a misfire anomaly in the internal combustion engine based on a misfire frequency of the internal combustion engine, and a normality restoration diagnosing process of diagnosing, in a state in which it is diagnosed that there is a misfire anomaly, that the misfire anomaly has been resolved when a measured value of the misfire frequency becomes less than or equal to a specified normality restoration determination value. The normality restoration diagnosing process is configured to not diagnose, during the execution of the specific-cylinder fuel cutoff process, that the misfire anomaly has been eliminated.

In another general aspect, a diagnosing apparatus for an internal combustion engine is provided. The internal combustion engine is configured to execute a specific-cylinder fuel cutoff process in which combustion in part of cylinders is stopped and combustion is continued in the remaining cylinders. The diagnosing apparatus includes processing circuitry. The processing circuitry is configured to execute a misfire anomaly diagnosing process of diagnosing whether there is a misfire anomaly in the internal combustion engine based on a misfire frequency of the internal combustion engine, a normality restoration diagnosing process of diagnosing, in a state in which it is diagnosed that there is a misfire anomaly, that the misfire anomaly has been resolved when a measured value of the misfire frequency becomes less than or equal to a specified normality restoration determination value, and a storing process of storing an operating state of the internal combustion engine at the time of diagnosis of the misfire anomaly. The normality restoration diagnosing process is configured to not diagnose that the misfire anomaly has been resolved in a case in which the operating state of the internal combustion engine stored in the storing process does not agree with a current operating state of the internal combustion engine. The operating state of the internal combustion engine stored in the storing process includes whether the specific-cylinder fuel cutoff process is being executed.

In yet another general aspect, a diagnosing method for an internal combustion engine is provided. The internal combustion engine is configured to execute a specific-cylinder fuel cutoff process in which combustion in part of cylinders is stopped and combustion is continued in the remaining cylinders. The diagnosing method includes: diagnosing whether there is a misfire anomaly in the internal combustion engine based on a misfire frequency of the internal combustion engine; diagnosing, in a state in which it is diagnosed that there is a misfire anomaly, that the misfire anomaly has been resolved when a measured value of the misfire frequency becomes less than or equal to a specified normality restoration determination value; and not diagnosing, during the execution of the specific-cylinder fuel cutoff process, that the misfire anomaly has been eliminated.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

First Embodiment

A diagnosing apparatus for an internal combustion engine 10 according to a first embodiment will now be described with reference to FIGS. 1 to 3.

<Configuration of Diagnosing Apparatus>

First, the configuration of the diagnosing apparatus of the present embodiment will be described with reference to FIG. 1.

Figure 1:
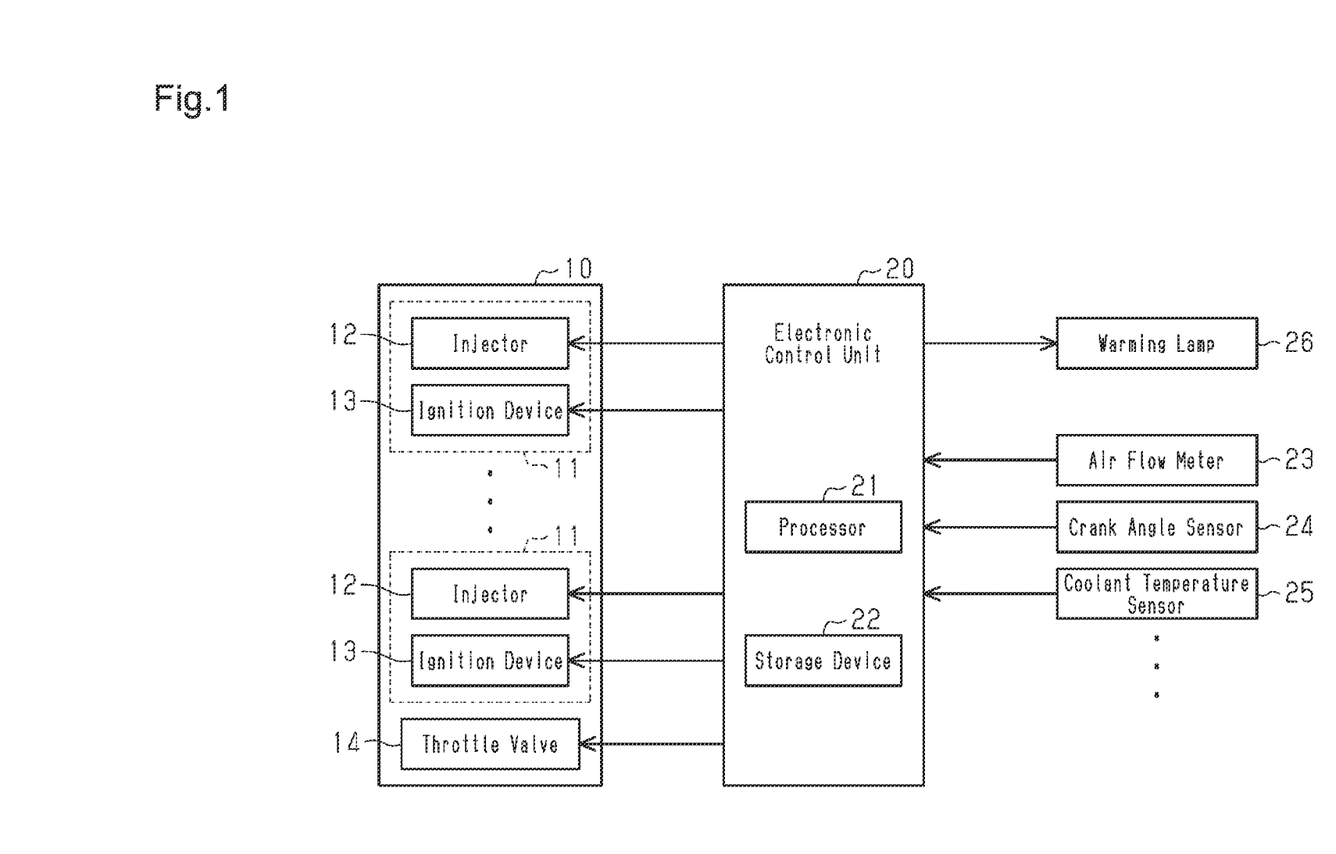
FIG. 1 is a schematic diagram showing the configuration of a diagnosing apparatus of an internal combustion engine according to a first embodiment.

As shown in FIG. 1, the internal combustion engine 10, for which the diagnosing apparatus of the present embodiment is used, includes cylinders 11. The internal combustion engine 10 includes injectors 12 and ignition devices 13, which are provided for respective the cylinders 11. Each injector 12 injects fuel to be burned in the corresponding cylinder 11, and each ignition device 13 ignites the fuel conducted into the corresponding cylinder 11. The internal combustion engine 10 is also provided with a throttle valve 14 configured to adjust the amount of intake air flowing into the cylinders 11. Separate cylinder numbers are assigned to the respective cylinders 11 of the internal combustion engine 10.

The internal combustion engine 10 is controlled by an electronic control unit 20. The electronic control unit 20 includes a processor 21 and a storage device 22. The processor 21 executes processes for controlling the internal combustion engine 10. The storage device 22 stores programs and data for the control. The electronic control unit 20 is connected to various sensors for acquiring an operating state of the internal combustion engine 10. Such sensors include an air flow meter 23, a crank angle sensor 24, and a coolant temperature sensor 25. The air flow meter 23 is a sensor that detects an intake air amount of the internal combustion engine 10. The crank angle sensor 24 is a sensor that detects a rotational phase of a crankshaft, which is an output shaft of the internal combustion engine 10. The coolant temperature sensor 25 is a sensor that detects the coolant temperature of the internal combustion engine 10.

The electronic control unit 20 controls the internal combustion engine 10 based on detection results of the sensors. The internal combustion engine 10 is controlled through a control of a fuel injection amount of the injectors 12, a control of ignition timing of the ignition devices 13, a control of the opening degree of the throttle valve 14, and the like. Further, the electronic control unit 20 is connected to a warning lamp 26 for notifying a driver of the occurrence of a misfire anomaly when a misfire anomaly occurs.

<Specific-Cylinder Fuel Cutoff Process>

The electronic control unit 20 executes a specific-cylinder fuel cutoff process as part of the control of the internal combustion engine 10. The specific-cylinder fuel cutoff process is a control for stopping combustion in part of the cylinders 11 of the internal combustion engine 10 and continuing combustion in the remaining cylinders 11. At the time of the specific-cylinder fuel cutoff process, the electronic control unit 20 stops fuel injection by the injector 12 and the ignition by the ignition device 13 of the cylinder 11 that is subjected to the combustion stop. In order to burn the unburned fuel remaining in the cylinders 11, ignition by the ignition device 13 may be continued even in the cylinder 11 in which the combustion is stopped.

When the specific-cylinder fuel cutoff process is executed, fresh air is directly discharged to the exhaust passage from the cylinder 11 in which combustion is stopped. Therefore, the exhaust gas is made lean even if lean combustion is not performed in the remaining cylinders 11, which continue combustion.

The specific-cylinder fuel cutoff process is executed, for example, for the following purposes. A filter that traps particulate matter (PM) in exhaust gas may be provided in an exhaust passage of the internal combustion engine 10. Such a filter is clogged when deposition of PM progresses. The PM deposited on the filter can be burned and removed by making the exhaust gas lean and supplying oxygen to the filter. However, if lean combustion is performed in each cylinder 11 in order to make the exhaust gas lean, the NOx emission of the internal combustion engine 10 increases. When the specific-cylinder fuel cutoff process is executed, fresh air is discharged from the cylinder 11 in which combustion is stopped. Therefore, if the specific-cylinder fuel cutoff process is executed, the exhaust gas can be made lean without performing lean combustion in the remaining cylinders 11, which continue combustion. In this manner, the specific-cylinder fuel cutoff process is executed to remove the PM deposited on the filter while limiting the deterioration of the emission.

<Misfire Anomaly Diagnosing Process>

In the internal combustion engine 10, a misfire anomaly, in which misfire occurs frequently, may occur due to an anomaly in the injectors 12, the ignition devices 13, or the like. The electronic control unit 20 executes a misfire anomaly diagnosing process for diagnosing whether there is a misfire anomaly, in parallel with the control of the internal combustion engine 10. In the present embodiment, the electronic control unit 20 corresponds to a diagnosing apparatus. The electronic control unit 20 executes the misfire anomaly diagnosis for each of multiple misfire determination regions, which are defined according to the rotation speed, the load, and the warm-up state of the internal combustion engine 10.

Figure 2:
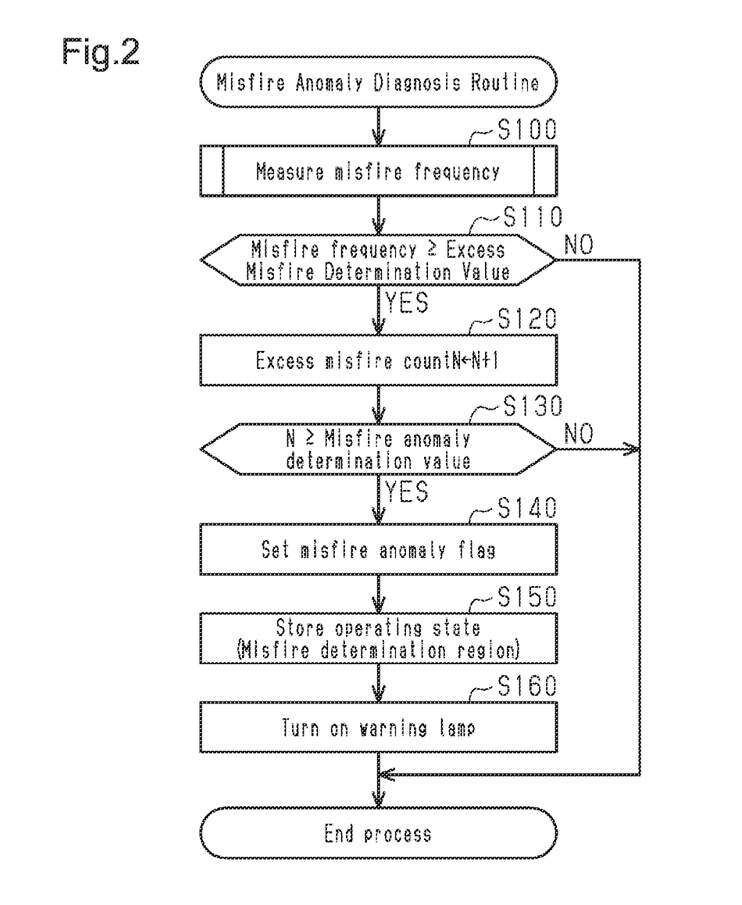
FIG. 2 is a flowchart of a misfire anomaly diagnosis routine executed by the diagnosing apparatus of the first embodiment.

FIG. 2 shows a flowchart of a misfire anomaly diagnosis routine executed for the misfire anomaly diagnosing process by the electronic control unit 20. During the operation of the internal combustion engine 10, the electronic control unit 20 repeatedly executes this routine at a specified control cycle.

When this routine is started, the electronic control unit 20 first measures frequency of misfires in step S100. The number of misfires occurring while combustion is performed a specified number of times is defined as the misfire frequency.

The electronic control unit 20 measures the misfire frequency in the following manner. The internal combustion engine 10 maintains rotation by torque generated by combustion in each cylinder 11. When a misfire occurs, the generation of the torque is temporarily interrupted, so that a rotational fluctuation occurs in the internal combustion engine 10. Based on the detection signal of the crank angle sensor 24, the electronic control unit 20 performs misfire determination for each combustion of the internal combustion engine 10 in order to check whether rotational fluctuation due to misfire has occurred. Then, the electronic control unit 20 obtains the number of times of misfire determination per specified number of combustions as a measured value of misfire frequency.

After measuring the misfire frequency, the electronic control unit 20 determines whether the misfire frequency is greater than or equal to a specified excess misfire determination value in the subsequent step S110. When the misfire frequency is greater than or equal to the excess misfire determination value (YES), the electronic control unit 20 advances the process to step S120. If the misfire frequency is less than the excess misfire determination value (NO), the electronic control unit 20 ends the process of this routine in the current control cycle.

When the process is advanced to step S120, the electronic control unit 20 increments the value of an excess misfire count N in step S120. The excess misfire count N represents the number of times the misfire frequency has been greater than or equal to the excess misfire determination value in the current trip. Specifically, the excess misfire count N is separately set for each misfire determination region. In step S120, the electronic control unit 20 increments the value of the excess misfire count N of the misfire determination region that corresponds to the current operating state of the internal combustion engine 10. The electronic control unit 20 resets the value of the excess misfire count N of each misfire determination region to 0 at the end of the trip.

Next, in step S130, the electronic control unit 20 determines whether the value of the excess misfire count N incremented in step S120 is greater than or equal to a specified misfire anomaly determination value. If the excess misfire count N is greater than or equal to the misfire anomaly determination value (YES), the electronic control unit 20 advances the process to step S140. If the excess misfire count N is less than the misfire anomaly determination value (NO), the process of this routine in the current control cycle is ended.

When the process is advanced to step S140, the electronic control unit 20 sets a misfire anomaly flag in step S140. The misfire anomaly flag is a flag indicating whether a misfire anomaly has occurred. That is, the electronic control unit 20 sets the misfire anomaly flag when diagnosing that there is a misfire anomaly. The state of the misfire anomaly flag is maintained even after the end of the trip, and is inherited to the next trip.

Next, in step S150, the electronic control unit 20 stores the current operating state of the internal combustion engine 10. Specifically, the electronic control unit 20 stores the misfire determination region corresponding to the current operating state of the internal combustion engine 10. In step S160, the electronic control unit 20 turns on the warning lamp 26, and then ends the process of this routine in the current control cycle.

As described above, the misfire anomaly flag is separately set for each misfire determination region. Thus, the misfire determination region for which the misfire anomaly flag is set is clear by checking which misfire determination region the flag belongs to. Therefore, in practice, the electronic control unit 20 sets the misfire anomaly flag for the misfire determination region corresponding to the current operating state of the internal combustion engine 10 to perform the processes of step S140 and step S150.

<Normality Restoration Diagnosing Process>

A misfire anomaly as described above is temporary and may be resolved spontaneously over time. Next, a normality restoration diagnosing process for diagnosing a restoration to a normal state from a misfire anomaly will be described.

Figure 3:
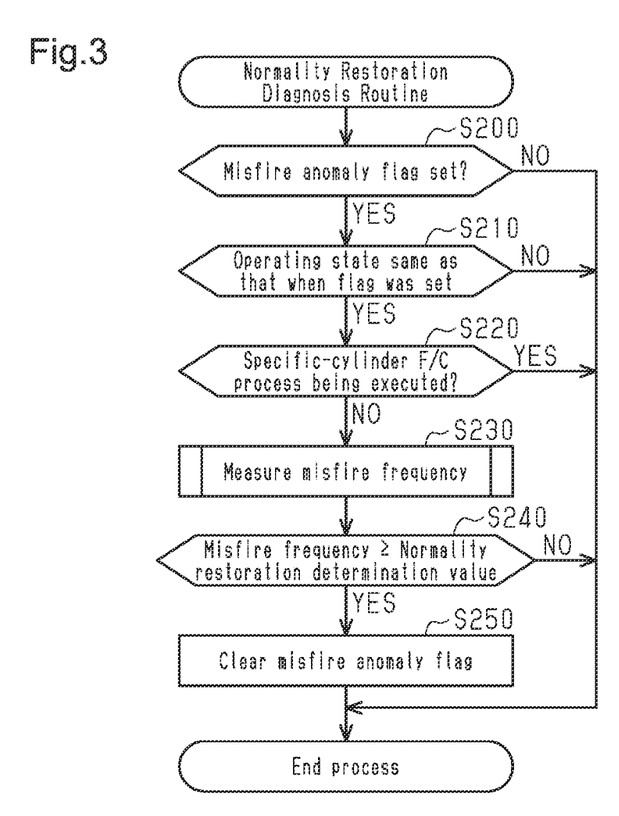
FIG. 3 is a flowchart of a normality restoration diagnosis routine executed by the diagnosing apparatus of the first embodiment.

FIG. 3 is a flowchart of a normality restoration diagnosis routine executed for the normality restoration diagnosing process by the electronic control unit 20. During the operation of the internal combustion engine 10, the electronic control unit 20 repeatedly executes this routine at a specified control cycle. In FIG. 3 and the subsequent figures, F/C represents a fuel cutoff process.

When this routine is started, the electronic control unit 20 first determines in step S200 whether the misfire anomaly flag is set. If the misfire anomaly flag is set (YES), the electronic control unit 20 advances the process to step S210. If the misfire anomaly flag is not set (NO), the electronic control unit 20 ends the process of this routine in the current control cycle.

When the process is advanced to step S210, in step S210, the electronic control unit determines whether the current operating state of the internal combustion engine 10 is the same as that when the misfire anomaly flag was set. Specifically, in step S210, the electronic control unit 20 determines whether the operating state stored at step S150 in FIG. 2 agrees with the current operating state. In step S150 of FIG. 2, the misfire determination region in which the misfire anomaly flag is set is stored. Therefore, in step S210, it is determined whether the misfire determination region that corresponds to the current operating state of the internal combustion engine 10 is the same as the misfire determination region when the misfire anomaly flag was set. If the operating state belongs to the same misfire determination region as that when the misfire anomaly flag was set (YES), the electronic control unit 20 advances the process to step S220. If the operating state does not belong to the same misfire determination region as that when the misfire anomaly flag was set (NO), the electronic control unit 20 ends the process of this routine in the current control cycle. As described above, the misfire anomaly flag is separately set for each misfire determination region. Therefore, if the state of the misfire anomaly flag in the misfire determination region that corresponds to the current operating state of the internal combustion engine 10 is checked, the determinations in step S200 and step S210 can be performed simultaneously.

When the process is advanced to step S220, the electronic control unit 20 determines in step S220 whether the specific-cylinder fuel cutoff process is being executed. If the specific-cylinder fuel cutoff process is being executed (YES), the electronic control unit 20 ends the process of this routine in the current control cycle. If the specific-cylinder fuel cutoff process is not being executed (NO), the electronic control unit 20 advances the process to step S230.

When the process is advanced to step S230, the electronic control unit 20 measures the misfire frequency in step S230 as in step S100 of FIG. 2. Next, in step S240, the electronic control unit 20 determines whether the measured misfire frequency is less than or equal to the specified normality restoration determination value. The normality restoration determination value is set to a positive value less than or equal to the excess misfire determination value described above. If the misfire frequency is less than or equal to the normality restoration determination value (YES), the electronic control unit 20 advances the process to step S250. If the misfire frequency exceeds the normality restoration determination value (NO), the process of this routine in the current control cycle is ended. When the process is advanced to step S250, the electronic control unit 20 clears the misfire anomaly flag of the misfire determination region that corresponds to the current operating state of the internal combustion engine 10 in step S250. That is, it is diagnosed that the misfire anomaly has been resolved. Then, the electronic control unit 20 ends the process of this routine in the current control cycle. The electronic control unit 20 turns off the warning lamp 26 when the misfire anomaly flags of all the misfire determination regions are cleared.

Operation and Advantages of First Embodiment

Operation and advantages of the present embodiment will now be described.

The electronic control unit 20 counts, as the excess misfire count N, the number of times the measurement value of the misfire frequency is greater than or equal to the excess misfire determination value after the trip is started. The electronic control unit 20 diagnoses that there is a misfire anomaly when the excess misfire count N is greater than or equal to the misfire anomaly determination value. That is, when the electronic control unit 20 determines that the misfire frequency is high based on the measurement result of the misfire frequency, the electronic control unit 20 diagnoses that there is a misfire anomaly. Further, the electronic control unit 20 diagnoses that the misfire anomaly has been resolved when the measured value of the misfire frequency is less than or equal to the normality restoration determination value after the diagnosis of a misfire anomaly.

On the other hand, the electronic control unit 20 performs the specific-cylinder fuel cutoff process during the operation of the internal combustion engine 10. In the specific-cylinder fuel cutoff process, combustion in part of the cylinders 11 is stopped. In the following description, the cylinder 11 in which combustion is stopped in the specific-cylinder fuel cutoff process is referred to as an F/C cylinder.

In the specific-cylinder fuel cutoff process, the cylinder 11 in which there is a misfire anomaly may become an F/C cylinder. In such a case, the F/C cylinder is not subjected to the misfire determination because combustion is stopped even if a latent misfire anomaly continues. Therefore, when the cylinder 11 in which there is a misfire anomaly is an F/C cylinder, a misfire that should occur does not become apparent. Therefore, there is a possibility that the misfire frequency measured during the execution of the specific-cylinder fuel cutoff process becomes a value smaller than the original value. Therefore, when the measured value of the misfire frequency during the execution of the specific-cylinder fuel cutoff process is used in the normality restoration diagnosing process, a misfire anomaly may erroneously be diagnosed as having been resolved even if it has not actually been resolved.

In this regard, the normality restoration diagnosing process executed by the electronic control unit 20 is configured to not perform the measurement of the misfire frequency and the determination of whether a misfire anomaly has been resolved based on the measured value during the execution of the specific-cylinder fuel cutoff process, in which a latent misfire may be concealed. That is, the normality restoration diagnosing process is configured to not diagnose, during the execution of the specific-cylinder fuel cutoff process, that the misfire anomaly has been eliminated. Therefore, in the present embodiment, the diagnosis that the misfire anomaly has been resolved in the normality restoration diagnosing process is not performed during the execution of the specific-cylinder fuel cutoff process.

The diagnosing apparatus of the present embodiment described above achieves the following advantages.

(1) The normality restoration diagnosing process is configured to not diagnose, during the execution of the specific-cylinder fuel cutoff process, that the misfire anomaly has been eliminated. Thus, even if the cylinder 11 in which there is a misfire anomaly is an F/C cylinder, it is not erroneously diagnosed that the misfire anomaly has been resolved in the normality restoration diagnosing process. Therefore, the diagnosing apparatus of the present embodiment improves diagnostic accuracy of misfire anomalies.

(2) During the execution of the specific-cylinder fuel cutoff process, the measurement of the misfire frequency for the diagnosis in the normality restoration diagnosing process is stopped. Therefore, it is possible to omit unnecessary measurement of the misfire frequency that is not used to diagnose that a misfire anomaly has been resolved.

(3) Diagnosis of a misfire anomaly and restoration of normality is performed separately for each of multiple misfire determination regions, which are defined according to the rotation speed, the load, and the warm-up state of the internal combustion engine 10. A misfire anomaly may occur only in a specific operating state of the internal combustion engine 10. Therefore, by performing diagnosis separately for each misfire determination region, it is possible to accurately diagnose the occurrence and resolution of a misfire anomaly.

Second Embodiment

A diagnosing apparatus for an internal combustion engine according to a second embodiment will now be described with reference to FIGS. 4 and 5. In the present embodiment, like or the same reference numerals are given to those components that are like or the same as the corresponding components of the above-described embodiments, and the detailed description will be omitted. Differences between the diagnosing apparatuses of the first embodiment and the present embodiment exist in parts of the misfire anomaly diagnosing process and the normality restoration diagnosing process.

<Misfire Anomaly Diagnosing Process>

Figure 4:
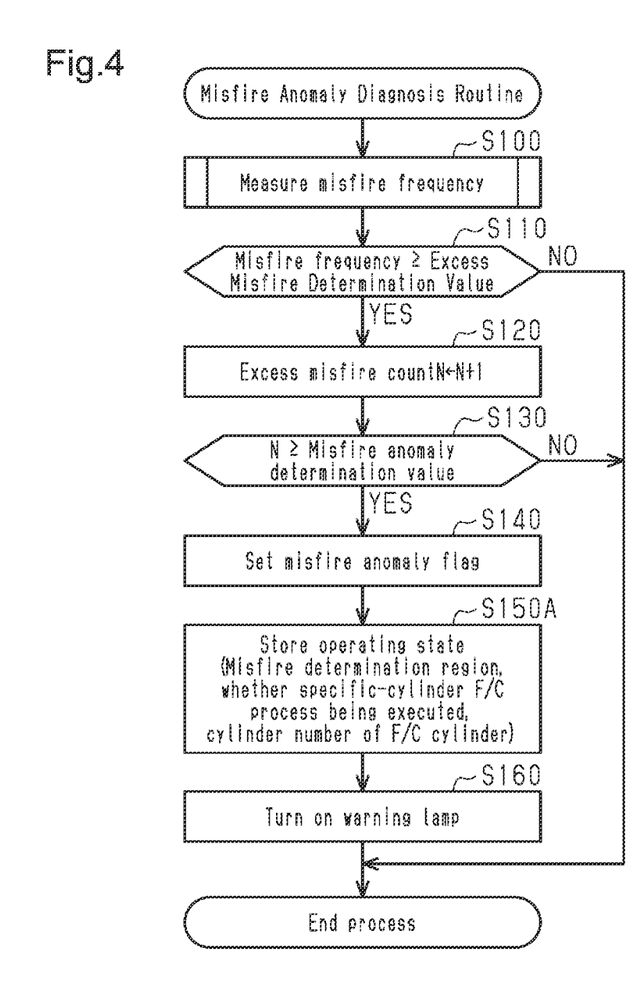
FIG. 4 is a flowchart of a misfire anomaly diagnosis routine executed by a diagnosing apparatus of an internal combustion engine according to a second embodiment.

FIG. 4 is a flowchart of a misfire anomaly diagnosis routine executed by the electronic control unit 20 in the diagnosing apparatus of the present embodiment. In the routine of FIG. 4, the process of step S150 in FIG. 3 is replaced with the process of step S150A described below.

Also, in the present embodiment, when the excess misfire count N is greater than or equal to the misfire anomaly determination value (S130: YES), the electronic control unit 20 diagnoses that there is a misfire anomaly and sets the misfire anomaly flag (S140). Thereafter, in the first embodiment, in step S150 of FIG. 3, the misfire determination region in which the misfire anomaly flag is set is stored as the operating state of the internal combustion engine 10 at that time. In contrast, in the present embodiment, in step S150A, in addition to the misfire determination region, the electronic control unit 20 stores whether the specific-cylinder fuel cutoff process is being executed and the cylinder number of the F/C cylinder as the operating state of the internal combustion engine 10 when the misfire anomaly flag is set. At this time, the electronic control unit 20 may store, not the cylinder number itself, but identification information of the cylinder 11 that identifies the cylinder number of the F/C cylinder. In the present embodiment, the process of step S150A corresponds to a storing process of storing the operating state of the internal combustion engine 10 when it is determined that there is a misfire anomaly.

<Normality Restoration Diagnosing Process>

Figure 5:
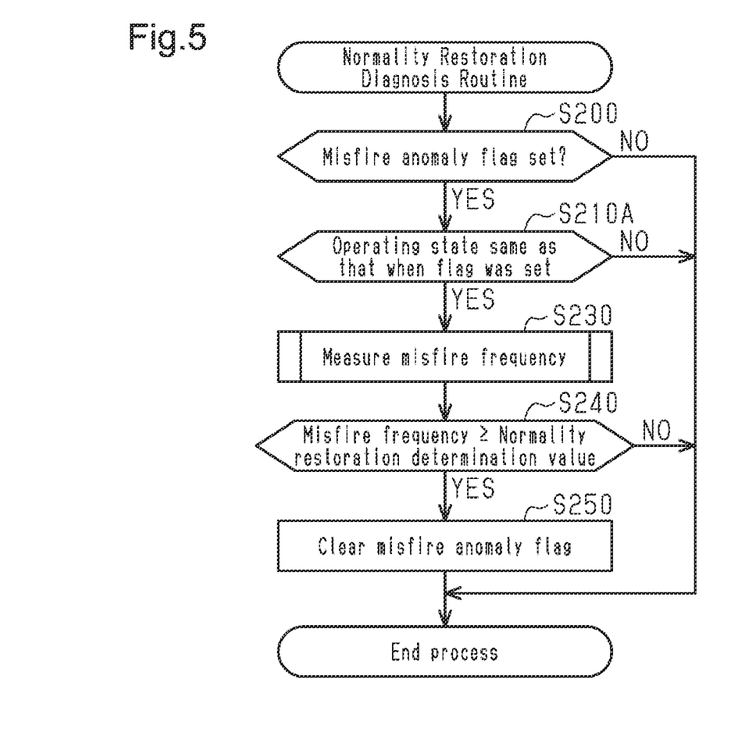
FIG. 5 is a flowchart of a normality restoration diagnosis routine executed by the diagnosing apparatus of the second embodiment.

FIG. 5 shows a flowchart of a normality restoration diagnosis routine executed by the electronic control unit 20 in the diagnosing apparatus of the present embodiment. In the routine of FIG. 5, the processes of steps S210 and S220 of FIG. 4 are replaced with the process of step S210A described below.

In this routine also, the electronic control unit 20 first determines in step S200 whether the misfire anomaly flag is set. If the misfire anomaly flag is set, the electronic control unit 20 advances the process to step S210A. In step S210A, the electronic control unit 20 determines whether the current operating state of the internal combustion engine 10 is the same as the operating state at the time of setting the misfire anomaly flag, which has been stored in step S150A of FIG. 4. If the operating states are the same (YES), the electronic control unit 20 advances the process to step S240. If the operating states are not the same (NO), the electronic control unit 20 ends the process of this routine in the current control cycle.

Operation and Advantages of Second Embodiment

The diagnosing apparatus of the first embodiment does not determine whether a misfire anomaly has been resolved in the normality restoration diagnosing process during the execution of the specific-cylinder fuel cutoff process. The present embodiment determines whether a misfire anomaly has been resolved in the normality restoration diagnosing process even during the execution of the specific-cylinder fuel cutoff process in a case in which the specific-cylinder fuel cutoff process is executed when it is diagnosed that there is a misfire anomaly, and the cylinder number of the current F/C cylinder is the same as the cylinder number of the F/C cylinder stored at the time of the diagnosis of the misfire anomaly. In this case, the diagnosis of a misfire anomaly is performed in a state in which combustion in the same cylinder 11 as the current F/C cylinder is stopped. In this case, the misfire anomaly diagnosed in the misfire anomaly diagnosis routine is not caused by the current F/C cylinder.

The diagnosing apparatus of the present embodiment achieves the following advantages.
(1) As the operating state of the internal combustion engine 10 at the time of diagnosis of a misfire anomaly, whether the specific-cylinder fuel cutoff process is being executed and the cylinder number of the F/C cylinder are stored. When the stored operating state of the internal combustion engine 10 does not agree with the current operating state of the internal combustion engine 10, the normality restoration diagnosing process is configured to not diagnose that the misfire anomaly has been resolved. Thus, in a state in which the cylinder 11 in which there is a misfire anomaly is the current F/C cylinder and a misfire that should occur is concealed by the specific-cylinder fuel cutoff process, it is not diagnosed that the misfire anomaly has been resolved. Therefore, the diagnosing apparatus of the present embodiment improves diagnostic accuracy of misfire anomalies.
(2) When the specific-cylinder fuel cutoff process is executed at the time of diagnosis of a misfire anomaly and the cylinder number of the current F/C cylinder is the same as the cylinder number of the F/C cylinder stored at the time of the diagnosis of the misfire anomaly, diagnosis of whether the misfire anomaly has been resolved in the normality restoration diagnosing process is performed even during the specific-cylinder fuel cutoff process. Therefore, there are more opportunities to diagnose whether a misfire anomaly has been eliminated than in the case of the first embodiment.
(3) When diagnosis in the normality restoration diagnosing process is not performed, the measurement of the misfire frequency is stopped. Therefore, it is possible to omit unnecessary measurement of the misfire frequency that is not used to diagnose that a misfire anomaly has been resolved.
(4) Diagnosis of a misfire anomaly and restoration of normality is performed separately for each of multiple misfire determination regions, which are defined according to the rotation speed, the load, and the warm-up state of the internal combustion engine 10. A misfire anomaly may occur only in a specific operating state of the internal combustion engine 10. Therefore, by performing diagnosis separately for each misfire determination region, it is possible to accurately diagnose the occurrence and resolution of a misfire anomaly.

OTHER EMBODIMENTS

The above-described embodiments may be modified as follows. The above-described embodiments and the following modifications can be combined as long as the combined modifications remain technically consistent with each other.

In the second embodiment, as the operating state of the internal combustion engine 10 at the time of diagnosis of a misfire anomaly, whether the specific-cylinder fuel cutoff process is being executed and the cylinder number of the F/C cylinder are stored. The specific-cylinder fuel cutoff process may be executed while always using the same cylinder 11 the F/C cylinder. In this case, the cylinder number of the F/C cylinder is always the same. Further, the F/C cylinder is switched sequentially under certain rules during the specific-cylinder fuel cutoff process. In these cases, the cylinder number of the F/C cylinder may be excluded from the stored operating state of the internal combustion engine 10.

In the above-described embodiments, the misfire frequency is measured in the misfire anomaly diagnosis routine and the normality restoration diagnosis routine.

In the above-described embodiments, when diagnosis in the normality restoration diagnosis is not performed, measurement of the misfire frequency is stopped. When the misfire frequency is measured for applications other than the diagnosis in the normality restoration diagnosis, the misfire frequency may continue to be measured even when the diagnosis in the normality restoration diagnosis is not performed.

In the above-described embodiments, whether there is a misfire anomaly is diagnosed by determining that there is a misfire anomaly when the number of times the misfire frequency is greater than or equal to the excess misfire determination value is greater than or equal to the misfire anomaly determination value. As long as diagnosis is based on the misfire frequency of the internal combustion engine 10, whether there is a misfire anomaly may be diagnosed in another mode. Also, the misfire determination for each combustion may be performed using a method different from that of the above-described embodiments.

In the above-described embodiments, the misfire determination region at the time of diagnosis of a misfire anomaly is stored in the misfire anomaly diagnosing process. In place of the misfire determination region, the rotation speed, the load, and the warm-up state of the internal combustion engine 10 may be stored. Other parameters indicating the operating state of the internal combustion engine 10 may also be stored.

In the above-described embodiments, the diagnosis in the misfire anomaly diagnosing process and the diagnosis in the normality restoration diagnosing process are performed separately for each misfire determination region. Diagnosis may be performed without setting the misfire determination region.

The electronic control unit 20 is not limited to a device including processing circuitry that includes a CPU and a ROM and executes software processing. That is, the electronic control unit 20 may be modified as long as it includes any one of the following configurations (a) to (c).

(a) The electronic control unit 20 includes one or more processors that execute various processes according to computer programs. The processor includes a CPU and a memory such as RAM and ROM. The memory stores program codes or instructions configured to cause the CPU to execute processes. The memory, which is a computer-readable medium, includes any type of media that are accessible by general-purpose computers and dedicated computers.

(b) The electronic control unit 20 includes one or more dedicated hardware circuits that execute various processes. The dedicated hardware circuits include, for example, an application specific integrated circuit (ASIC) and a field programmable gate array (FPGA).

(c) The electronic control unit 20 includes a processor that executes part of various processes according to programs and a dedicated hardware circuit that executes the remaining processes.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A diagnosing apparatus for an internal combustion engine, wherein the internal combustion engine is configured to execute a specific-cylinder fuel cutoff process in which combustion in part of cylinders is stopped and combustion is continued in the remaining cylinders, and the diagnosing apparatus comprises
   a processing circuitry, wherein the processing circuitry is configured to execute
      a misfire anomaly diagnosing process of diagnosing whether there is a misfire anomaly in the internal combustion engine based on a misfire frequency of the internal combustion engine, and
      a normality restoration diagnosing process of diagnosing, in a state in which it is diagnosed that there is a misfire anomaly, that the misfire anomaly has been resolved when a measured value of the misfire frequency becomes less than or equal to a specified normality restoration determination value, and
   the normality restoration diagnosing process is configured to stop measurement of the misfire frequency and to not diagnose, during the execution of the specific-cylinder fuel cutoff process, that the misfire anomaly has been eliminated.

2. The diagnosing apparatus for the internal combustion engine according to claim 1, wherein the processing circuitry is configured to execute the misfire anomaly diagnosing process for each of multiple misfire determination regions, which are defined according to a rotation speed, a load, and a warm-up state of the internal combustion engine.

3. The diagnosing apparatus for the internal combustion engine according to claim 2, wherein the processing circuitry is configured to perform simultaneously a process of determining whether a misfire anomaly flag in one of the misfire determination regions that corresponds to a current operating state of the internal combustion engine is set and a process of determining whether the current operating state of the internal combustion engine is the same as that when the misfire anomaly flag was set.

4. A diagnosing apparatus for an internal combustion engine, wherein the internal combustion engine is configured to execute a specific-cylinder fuel cutoff process in which combustion in part of cylinders is stopped and combustion is continued in the remaining cylinders, and the diagnosing apparatus comprises
   a processing circuitry, wherein the processing circuitry is configured to execute
      a misfire anomaly diagnosing process of diagnosing whether there is a misfire anomaly in the internal combustion engine based on a misfire frequency of the internal combustion engine,
      a normality restoration diagnosing process of diagnosing, in a state in which it is diagnosed that there is a misfire anomaly, that the misfire anomaly has been resolved when a measured value of the misfire frequency becomes less than or equal to a specified normality restoration determination value, and
      a storing process of storing an operating state of the internal combustion engine at the time of diagnosis of the misfire anomaly, and
   the normality restoration diagnosing process is configured to stop measurement of the misfire frequency and to not diagnose that the misfire anomaly has been resolved in a case in which the operating state of the internal combustion engine stored in the storing process does not agree with a current operating state of the internal combustion engine, and the operating state of the internal combustion engine stored in the storing process includes whether the specific-cylinder fuel cutoff process is being executed.

5. The diagnosing apparatus for the internal combustion engine according to claim 4, wherein the operating state of the internal combustion engine stored in the storing process includes a cylinder number of a cylinder in which combustion is stopped by the specific-cylinder fuel cutoff process.

6. The diagnosing apparatus for the internal combustion engine according to claim 4, wherein the processing circuitry is configured to execute the misfire anomaly diagnosing process for each of multiple misfire determination regions, which are defined according to a rotation speed, a load, and a warm-up state of the internal combustion engine.

7. The diagnosing apparatus for the internal combustion engine according to claim 4, wherein
the normality restoration diagnosing process is further configured to diagnose whether the misfire anomaly has been resolved during the specific-cylinder fuel cutoff process when the specific-cylinder fuel cutoff process is executed at the time of diagnosis of the misfire anomaly and in a case in which the operating state of the internal combustion engine stored in the storing process agrees with the current operating state of the internal combustion engine.

8. A diagnosing method for an internal combustion engine, wherein
the internal combustion engine is configured to execute a specific-cylinder fuel cutoff process in which combustion in part of cylinders is stopped and combustion is continued in the remaining cylinders, and
the diagnosing method comprises:
diagnosing whether there is a misfire anomaly in the internal combustion engine based on a misfire frequency of the internal combustion engine;
diagnosing, in a state in which it is diagnosed that there is a misfire anomaly, that the misfire anomaly has been resolved when a measured value of the misfire frequency becomes less than or equal to a specified normality restoration determination value; and
stopping measurement of the misfire frequency and not diagnosing, during the execution of the specific-cylinder fuel cutoff process, that the misfire anomaly has been eliminated.

* * * * *